United States Patent
Kurokawa

(10) Patent No.: US 8,472,068 B2
(45) Date of Patent: Jun. 25, 2013

(54) IMAGE PROCESSING APPARATUS, IMAGE PROCESSING SYSTEM, AND PROGRAM

(75) Inventor: Kazunori Kurokawa, Kanagawa (JP)

(73) Assignee: Fuji Xerox Co., Ltd., Tokyo (JP)

( * ) Notice: Subject to any disclaimer, the term of this patent is extended or adjusted under 35 U.S.C. 154(b) by 178 days.

(21) Appl. No.: 13/028,509

(22) Filed: Feb. 16, 2011

(65) Prior Publication Data

US 2012/0069403 A1 Mar. 22, 2012

(30) Foreign Application Priority Data

Sep. 17, 2010 (JP) ................................. 2010-209933

(51) Int. Cl.
*G06K 15/02* (2006.01)

(52) U.S. Cl.
USPC .......................... 358/1.18; 358/1.13; 358/1.15

(58) Field of Classification Search
USPC ....................... 358/1.18, 1.13, 1.15
See application file for complete search history.

(56) References Cited

U.S. PATENT DOCUMENTS

| | | | | |
|---|---|---|---|---|
| 7,471,401 | B2 * | 12/2008 | Saito | 358/1.13 |
| 2004/0015128 | A1 * | 1/2004 | Taylor | 604/92 |
| 2004/0190057 | A1 * | 9/2004 | Takahashi et al. | 358/1.15 |
| 2007/0229903 | A1 * | 10/2007 | Sato | 358/1.18 |
| 2009/0198534 | A1 * | 8/2009 | Brown et al. | 705/7 |

FOREIGN PATENT DOCUMENTS

JP B2 4042639 2/2008

\* cited by examiner

*Primary Examiner* — King Poon
*Assistant Examiner* — Andrew H Lam
(74) *Attorney, Agent, or Firm* — Oliff & Berridge, PLC

(57) ABSTRACT

An image processing apparatus includes a receiving unit that receives all image data of pages that are imposed; an input unit that inputs the number of pages in vertical and horizontal directions and a page opening direction; a calculation unit that calculates a division number on the basis of the number of pages and the page opening direction; an all image data dividing unit that divides the all image data into divided image data on the basis of the division number; and an acquisition unit that acquires a bind width and a back width from the all image data, wherein the printing position of the divided image data is corrected by calculating a margin from the bind width, the back width, a length of the print sheet, a length of the divided image data, and the number of pages of the divided image data in a correction direction.

6 Claims, 11 Drawing Sheets

IMAGE PROCESSING APPARATUS, IMAGE PROCESSING SYSTEM, AND PROGRAM

CROSS-REFERENCE TO RELATED APPLICATIONS

This application is based on and claims priority under 35 USC 119 from Japanese Patent Application No. 2010-209933 filed Sep. 17, 2010.

BACKGROUND (i) Technical Field

The present invention relates to an image processing apparatus, an image processing system, and a program.

(ii) Related Art

For example, when printing images on plural pages by using an offset press on a large size sheet such as an A1-size or A0-size recording sheet (Japanese Industrial Standards), the final image data is imposed in accordance with the size of the recording sheet to be used.

Before performing printing by using an offset press or the like, so-called proof printing is performed in order to check a printed image. Proof printing is usually performed on a recording sheet that has an A3 size (Japanese Industrial Standards) or smaller by dividing the image.

SUMMARY

According to a first aspect of the invention, an image processing apparatus includes a receiving unit that receives all image data of a plurality of pages that are imposed for making a double-page-spread booklet; an input unit that inputs data of the number of pages in vertical and horizontal directions and data of a page opening direction of the booklet to the all image data that is received by the receiving unit, the vertical and horizontal directions being defined beforehand; a calculation unit that calculates a division number on the basis of the data of the number of pages and the data of the page opening direction that are input by the input unit; an all image data dividing unit that divides the all image data into divided image data on the basis of the division number that is calculated by the calculation unit, the all image data being received by the receiving unit; and an acquisition unit that acquires bind width data and back width data from the all image data, wherein, when correcting a printing position so as to adjust a width of a margin, the printing position being a position at which the divided image data is printed on a print sheet, the printing position is corrected by calculating the margin from the acquired bind width data, the acquired back width data, a length of the print sheet in a correction direction, a length of the divided image data in the correction direction, and the number of pages of the divided image data in the correction direction.

BRIEF DESCRIPTION OF THE DRAWINGS

An exemplary embodiment of the present invention will be described in detail based on the following figures, wherein.

DETAILED DESCRIPTION

Figure 1:
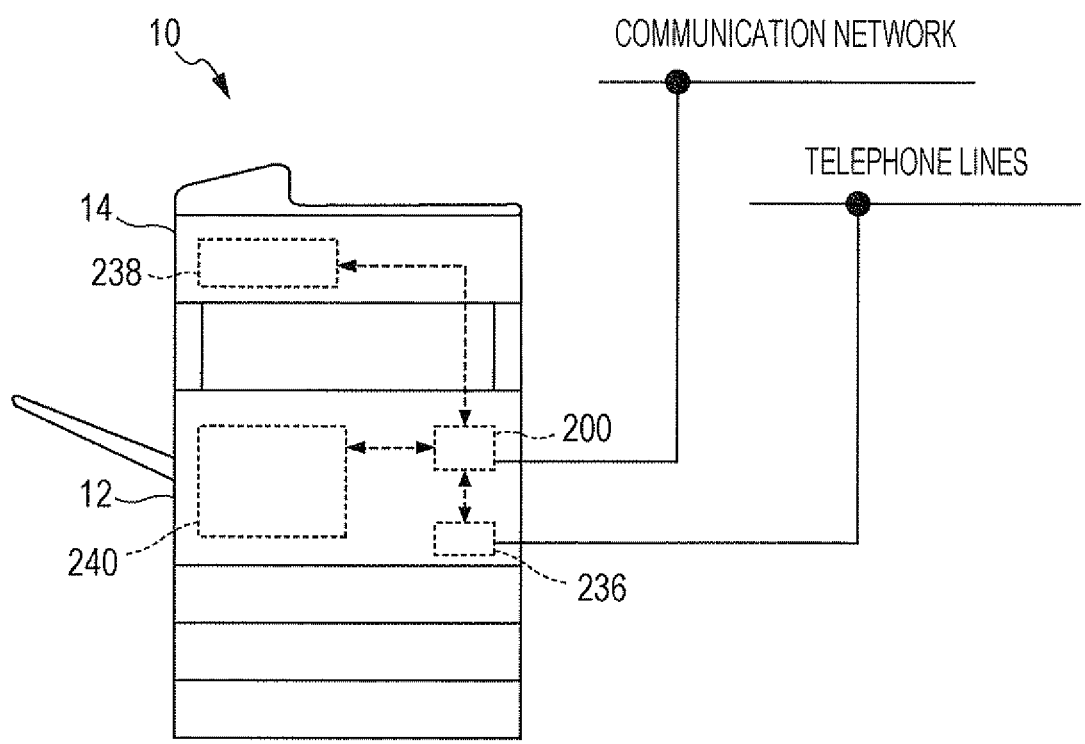
FIG. 1 is a schematic view of an image processing apparatus according to the exemplary embodiment.

FIG. 1 illustrates an image processing apparatus 10 according to an exemplary embodiment of the invention. The image processing apparatus 10 includes an image forming device 12 that forms an image on a recording sheet and an image reading device 14 that reads a document image. The image processing apparatus 10 may have a facsimile function 236.

The image processing apparatus 10 includes a main controller 200. The main controller 200 controls an image forming controller 240 that controls the image forming device 12 and an image reading controller 238 that controls the image reading device 14. Under such control, the image data of a document read by the image reading device 14 is temporarily stored, and the read image data or image data that has been acquired through a communication network 20 is sent to the image forming device 12.

The image forming device 12 includes a photoconductor drum. A charger, a scanning exposure unit, an image developing unit, a transfer unit, and a cleaning unit are disposed around the photoconductor drum. The charger uniformly charges the photoconductor drum. The scanning exposure unit scans a light beam on the basis of image data so as to form an electrostatic latent image. The image developing unit develops the electrostatic latent image on the photoconductor drum. The transfer unit transfers the developed image from the photoconductor drum to a recording sheet. The cleaning unit cleans the surface of the photoconductor drum after the transfer has been finished. A fixing unit is disposed on a path along which the recording sheet is transported. The fixing unit fixes the image, which has been transferred to the recording sheet.

The image reading device 14 includes a document table for positioning a document, a scanning mechanism that irradiates the document with light so as to scan the image of the document, and a photoelectric conversion element, such as a CCD, which receives light that is reflected or transmitted when the scanning mechanism scans the document.

Main Controller 200

Figure 2:
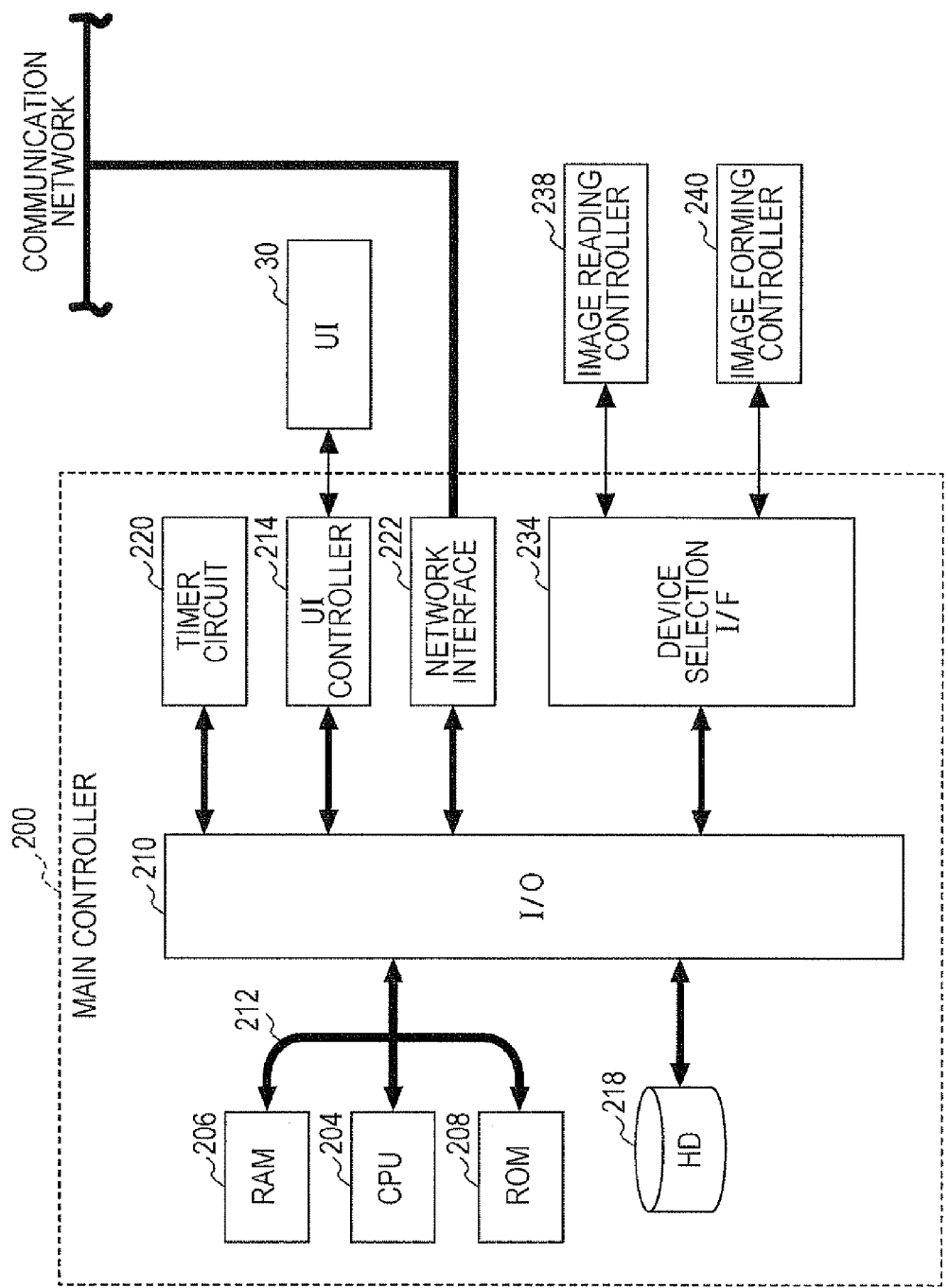
FIG. 2 is a hardware block diagram of a control system of the image processing apparatus according to the exemplary embodiment.

FIG. 2 is a hardware block diagram of the main controller 200.

As illustrated in FIG. 2, the main controller 200 includes a CPU 204, a RAM 206, a ROM 208, an I/O 210 (input/output unit), and a bus 212, such as a data bus or a control bus, that connects these components to one another. A UI 30 is connected to the I/O 210 through a UI controller 214. A hard disk 218 (HDD) is connected to the I/O 210. The CPU 204 operates on the basis of a program that is stored in the ROM 208 or the hard disk 218, and executes the functions of the main controller 200. Alternatively, the program may be installed from a recording medium (CD-ROM, DVD-ROM, or the like), and the CPU 204 may be operated on the basis of the program so as to perform image processing.

A timer circuit 220 and a network I/F 222 are connected to the I/O 210. Moreover, a device selection I/F 234 is connected to the I/O 210.

The device selection I/F 234 is connected to device controllers, such as the image reading controller 238 for controlling the image reading device 14 and the image forming controller 240 for controlling the image forming device 12.

Image Dividing Process

When using an offset printing press to make a booklet in accordance with a predetermined binding method, images are laid out (hereinafter may be referred to as "imposed") on, for example, an A0-size or A1-size (Japanese Industrial Standards) print sheet. In such a case, a proof image is usually formed (proof printing performed) in order to check the images to be printed. The proof image is printed by using an image forming device that is capable of forming an image on an A3-size or A4-size recording sheet.

In the present exemplary embodiment, image data for plural imposed pages is divided and printed on A3-size or A4-size print sheets. As the parameters for dividing the image data, the number of pages that are imposed on a print sheet in the vertical direction and in the horizontal direction and a page opening direction of images that are disposed adjacent to each other are necessary. Therefore, it is necessary to define the vertical and horizontal directions of the print sheet.

In the present exemplary embodiment, it is assumed that the print sheet is placed so that the long sides thereof extend in the left-right direction. The direction along the long sides of the print sheet will be referred to the "horizontal" direction, and the direction along the short sides of the print sheet will be referred to as the "vertical" direction.

Figure 3:
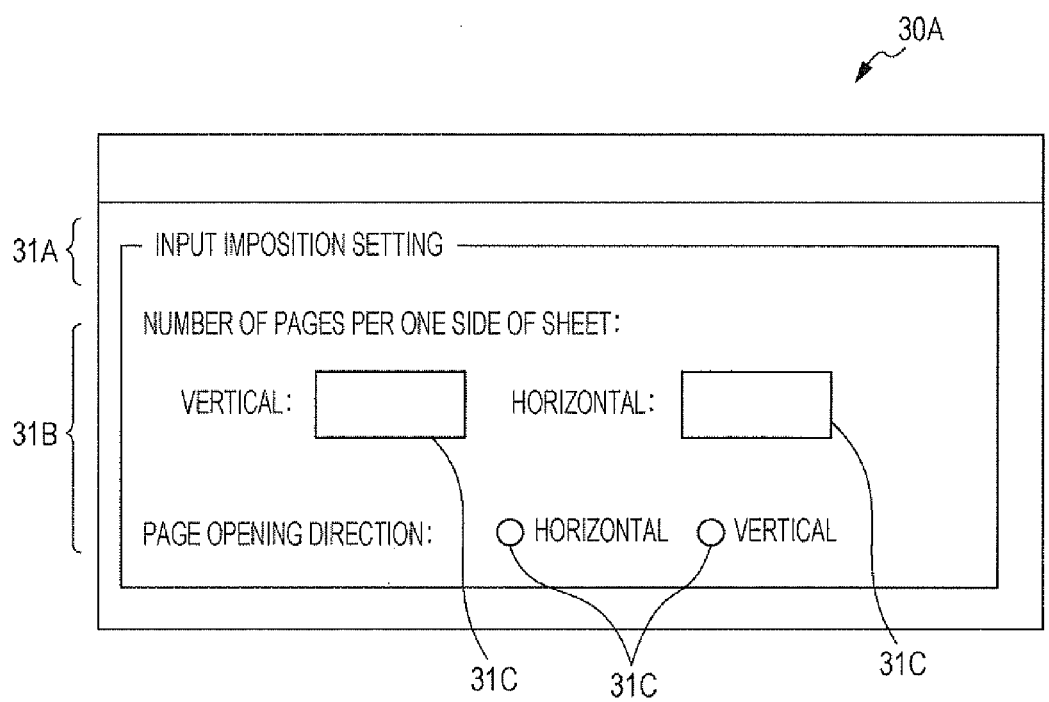
FIG. 3 illustrates an input screen that is displayed on a UI to prompt a user to input division parameters.

When a user requests proof printing and imposed image data is received, an input screen 30A, which is illustrated in FIG. 3, is displayed on the display of the UI 30, so as to allow the user to input the number of pages in the vertical direction, the number of pages in the horizontal direction, and the page opening direction.

The input screen 30A includes a message image 31A, a message image 31B, and box images 31C. The message image 31A is, for example, "Input Imposition Setting." The message image 31B prompts the user to input the "Number of Pages per One Side of Sheet (Vertical, Horizontal)" and the "Page Opening Direction". The box images 31C display the data that has been input by the user.

The CPU 204 of the main controller 200 calculates division numbers in the vertical and horizontal directions on the basis of the data that has been input (the number of pages m in the horizontal direction, the number of pages n in the vertical direction, and the horizontal or vertical page opening direction).

Half the number of pages in a direction that is specified as the page opening direction is a division number X, and the number of pages in a direction that is not specified as the page opening direction is a division number Y.

Figure 4:
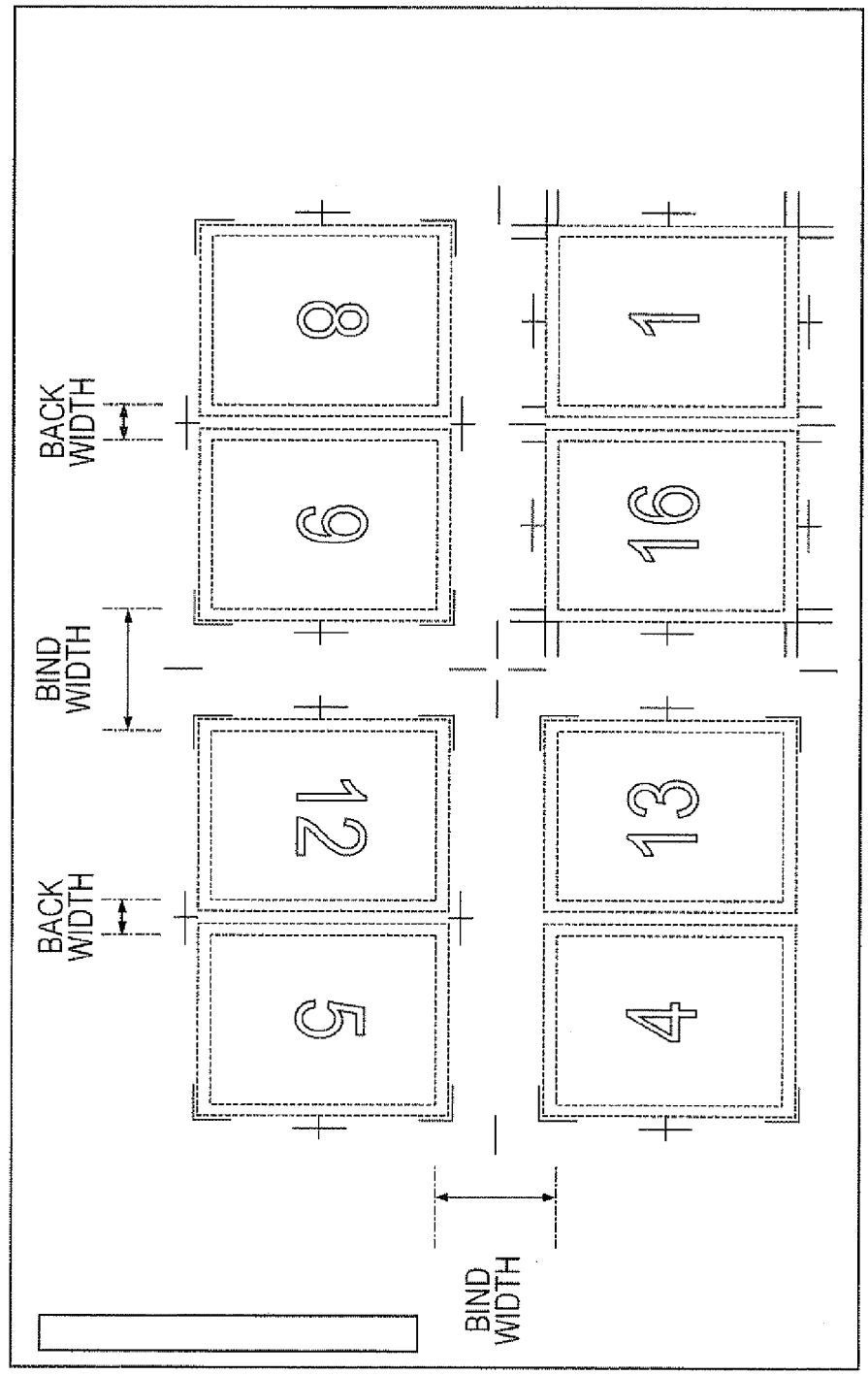
FIG. 4 is a plan view illustrating how images are (image data is) imposed on a print sheet according to the exemplary embodiment.
Figure 5:
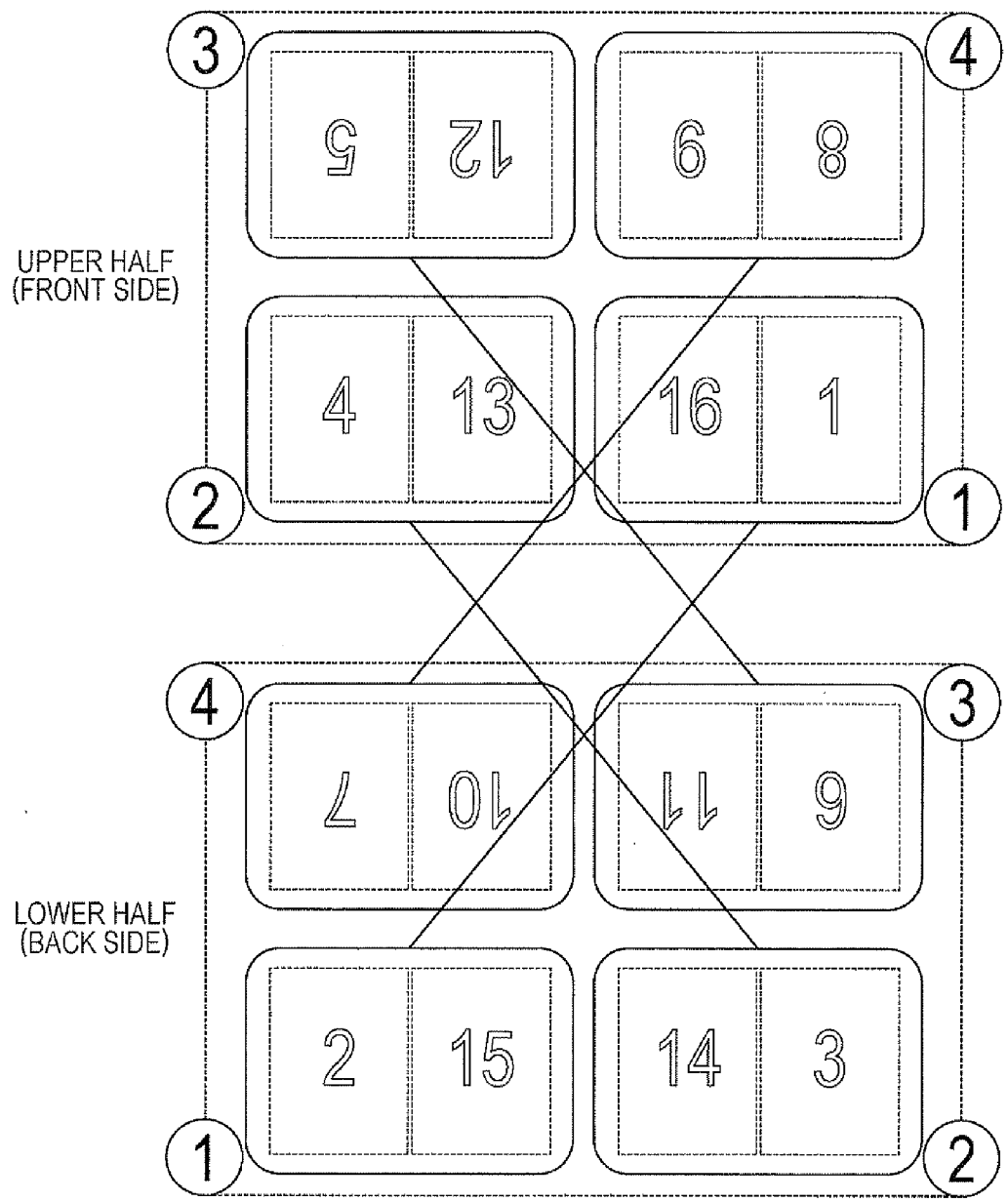
FIG. 5 illustrates a correspondence between images imposed on the front and the back sides of the print sheet illustrated in FIG. 4.

FIG. 4 illustrates an example of how images are imposed on a print sheet. FIG. 5 illustrates how images are imposed on the front and back sides of the print sheet of FIG. 4. The upper half of FIG. 5 illustrates the images imposed on the front side of the print sheet, and the lower half of FIG. 5 illustrates the images imposed on the back side of the print sheet. The outlined numbers in the images represent the pages.

The pages are imposed so that a booklet having the pages arranged in a proper order is to be made by folding and binding the print sheet in a predetermined way. The pages to which the same circled numbers are attached in the upper and lower halves of the FIG. 5 correspond to each other on the front and back sides of the print sheet.

In the example illustrated in FIG. 5, the number of pages m in the horizontal direction (along the long sides) of the print sheet is 4, the number of pages n in the vertical direction is 2, and the page opening direction is horizontal. Therefore, the division number X in the horizontal direction (page opening direction) is 2, and the division number Y in the vertical direction is 2 (see FIG. 6).

Image Reversing Process

Figure 7:
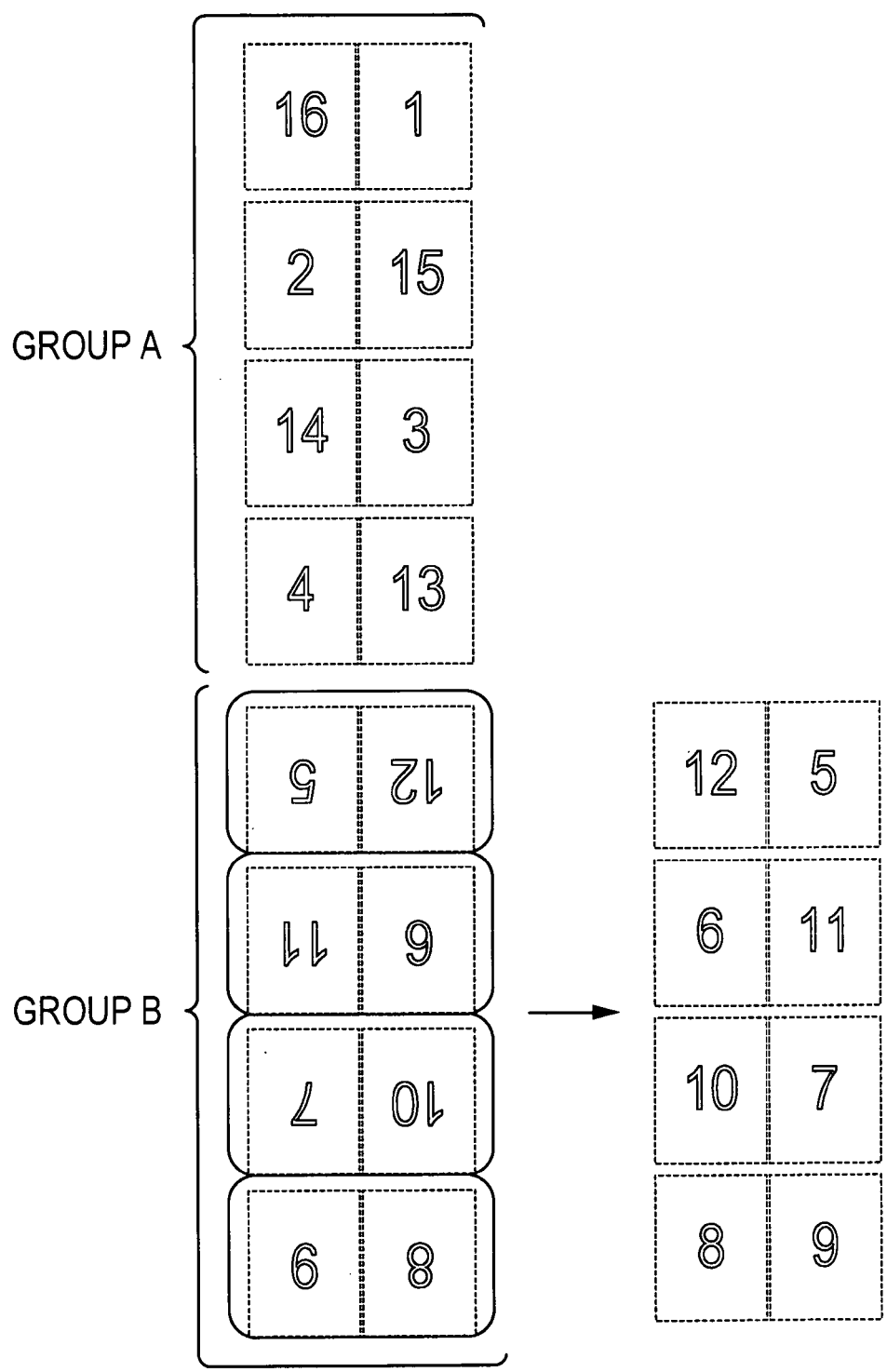
FIG. 7 is a plan view illustrating the top-bottom direction of proof images according to the exemplary embodiment.

In the present exemplary embodiment, when proof printing is performed in the order of circled numbers in FIG. 5, the top-bottom direction of the last four images is reversed as illustrated in FIG. 7.

Therefore, in the present exemplary embodiment, the pages for proof printing are divided into two groups each having the same top-bottom direction, and the top-bottom direction of the imposed image data of one of the two groups is reversed (rotated by 180°). The pages of the recording sheet are classified into two groups each having the same top-bottom direction by, for example, referring to top-bottom direction data attached to the image data.

Image Position Correcting Process

Figure 8:
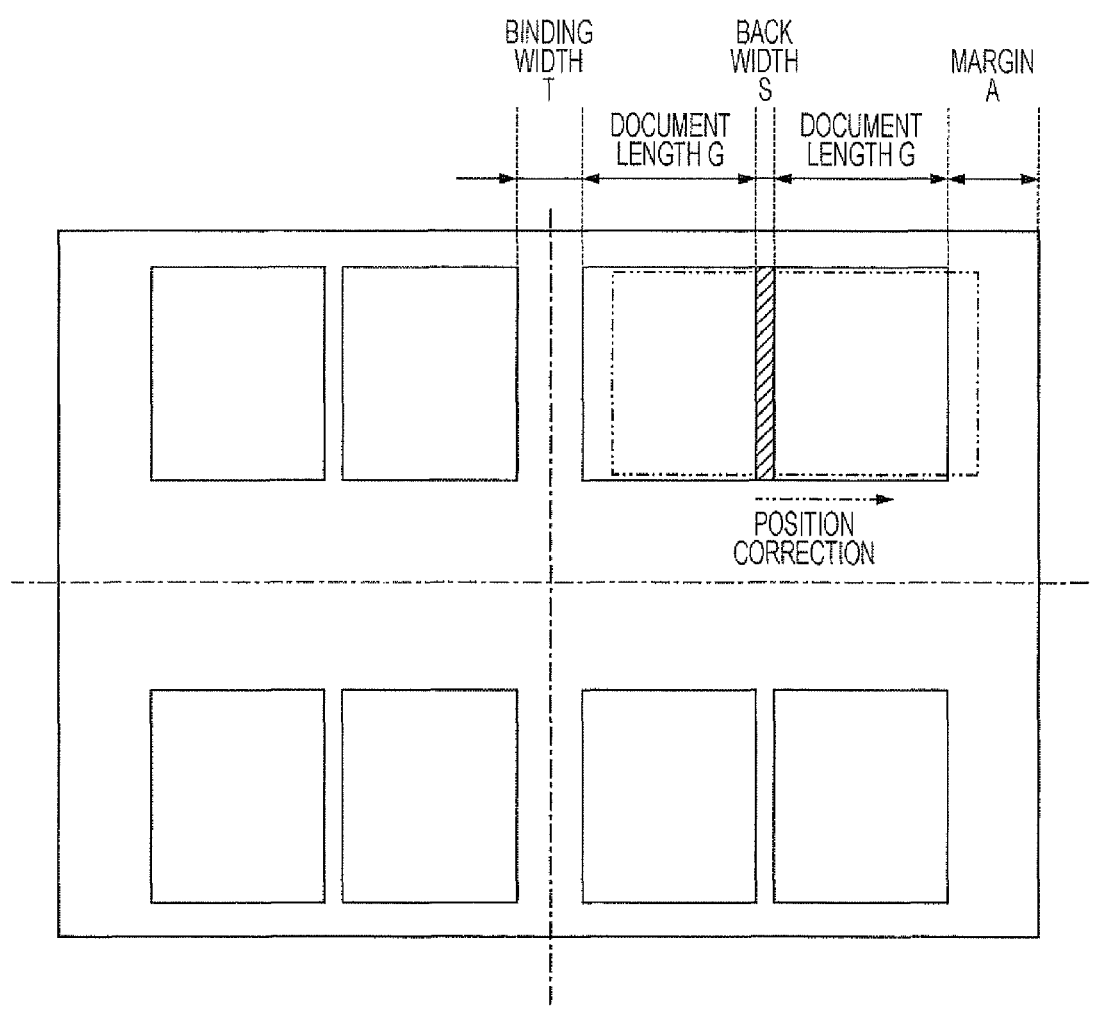
FIG. 8 is a plan view illustrating how images are disposed on a print sheet according to the exemplary embodiment.

As illustrated in FIG. 8, in the present exemplary embodiment, the position of an image on the print sheet may be displaced from the center of a divided region. In particular, when proof printing is performed on one side of the recording sheet at a time, such displacements occur on odd-numbered pages and even-numbered pages in an alternating manner.

Therefore, as illustrated in FIG. 8, in the present exemplary embodiment, the bind width and the back width are acquired from imposition data, and the length of the divided print sheet in the displacement correction direction and the lengths of the images in the displacement correction direction are read, and thereby a margin A is calculated. By comparing the margin A with half the bind width, a correction direction and a correction amount are obtained.

That is, as illustrated in FIG. 8, if (bind width T)/2<margin A, the correction direction is a direction toward the margin A (rightward in FIG. 8), and the correction amount is |(bind width T)/2−margin A|/2. If (bind width T)/2>margin A, the correction direction is a direction toward the bind width (leftward in FIG. 8), and the correction amount is |(bind width T)/2−margin A|/2.

Figure 9:
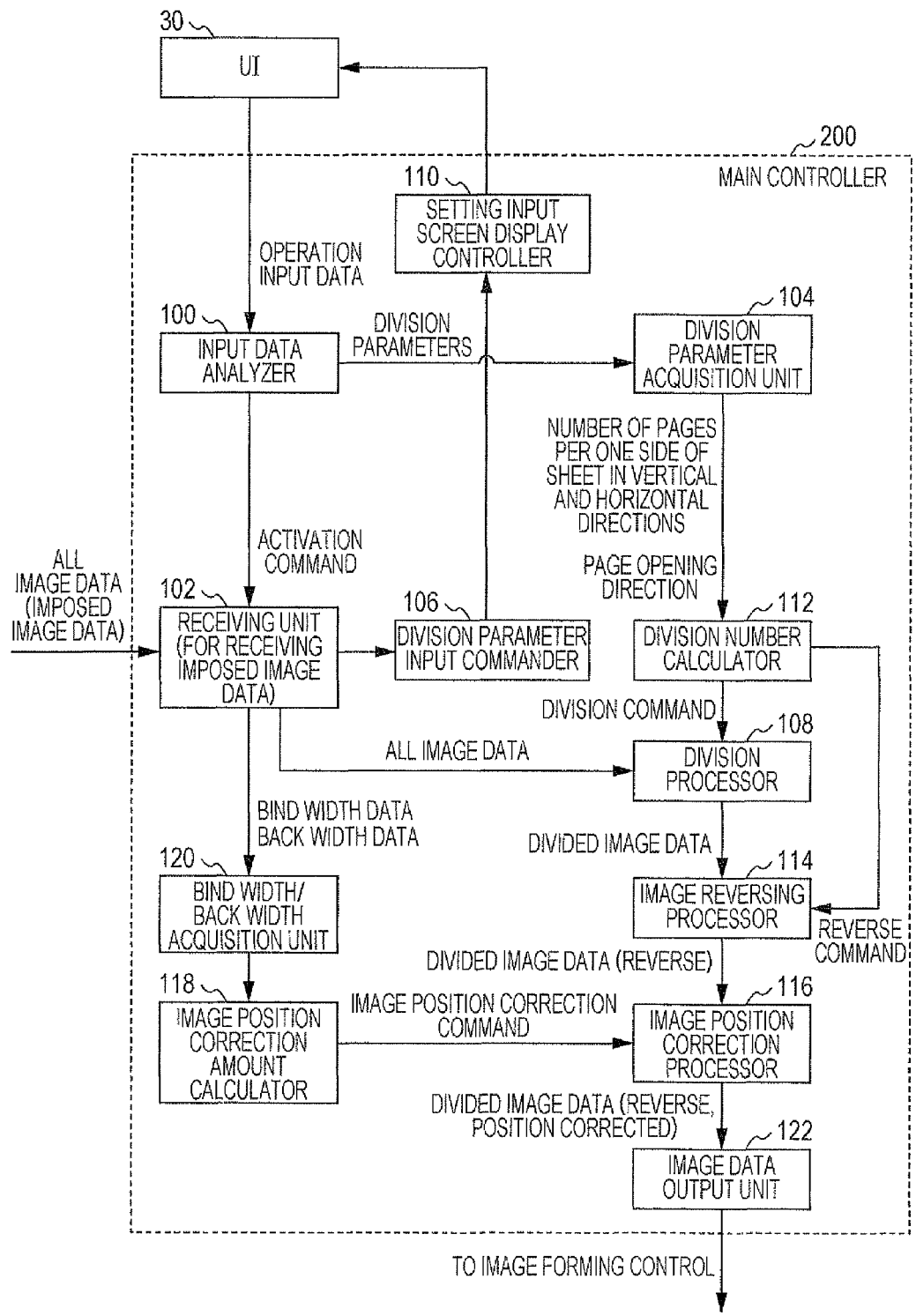
FIG. 9 is a functional block diagram of proof printing control that is performed by a main controller according to the exemplary embodiment.

FIG. 9 is a functional block diagram of the main controller 200. FIG. 9 illustrates functional blocks when the main controller 200 performs the process of dividing image data that has been imposed, the image reversing process, and the image position correcting process. FIG. 9 does not limit the hardware structure of the main controller 200.

As illustrated in FIG. 9, the UI 30 is connected to an input data analyzer 100. When a user inputs data by using the UI 30, the input data is sent to the input data analyzer 100.

An image data receiving unit 102 (hereinafter referred to as a "receiving unit 102"), which receives imposed image data, and a division parameter acquisition unit 104 are connected to the input data analyzer 100. The input data analyzer 100 analyzes the input data. If the input data includes a request for proof printing, the input data analyzer 100 activates the receiving unit 102 so that the receiving unit 102 receives the imposed image data for proof printing. If the input data analyzed by the input data analyzer 100 includes division parameters, the division parameter acquisition unit 104 acquires the input division parameters.

The receiving unit 102 is connected to a division parameter input commander 106 and a division processor 108. The receiving unit 102 is configured to receive all image data (imposed image data) for the entire area of the print sheet, which is used for proof printing. When receiving the data, the receiving unit 102 activates the division parameter input commander 106.

The division parameter input commander 106 controls a setting input screen display controller 110 so as to display the input screen 30A (see FIG. 3) on the UI 30 to prompt a user to input parameters that are necessary for dividing the image. The user performs input on the input screen 30A of the UI 30, and inputs the number of pages in the vertical and horizontal directions and the page opening direction, which are the division parameters.

The imposed image data received by the receiving unit 102 is sent to the division processor 108.

The division parameters, which the division parameter acquisition unit 104 has acquired from the input data analyzer 100, are sent to a division number calculator 112. The division number calculator 112 determines half the number of pages in a direction that is specified as the page opening direction (in the present exemplary embodiment, the horizontal direction along the long sides of the print sheet) to be the division number X, and determines the number of pages in a direction that is not specified as the page opening direction (in the present exemplary embodiment, the direction along the short sides of the print sheet) to be the division number Y. The "horizontal direction" is the direction along the long sides of the print sheet when the direction along the long sides of the print sheet is defined as the left-right direction and the direction along the short sides of the print sheet is defined as the top-bottom direction.

Figure 6:
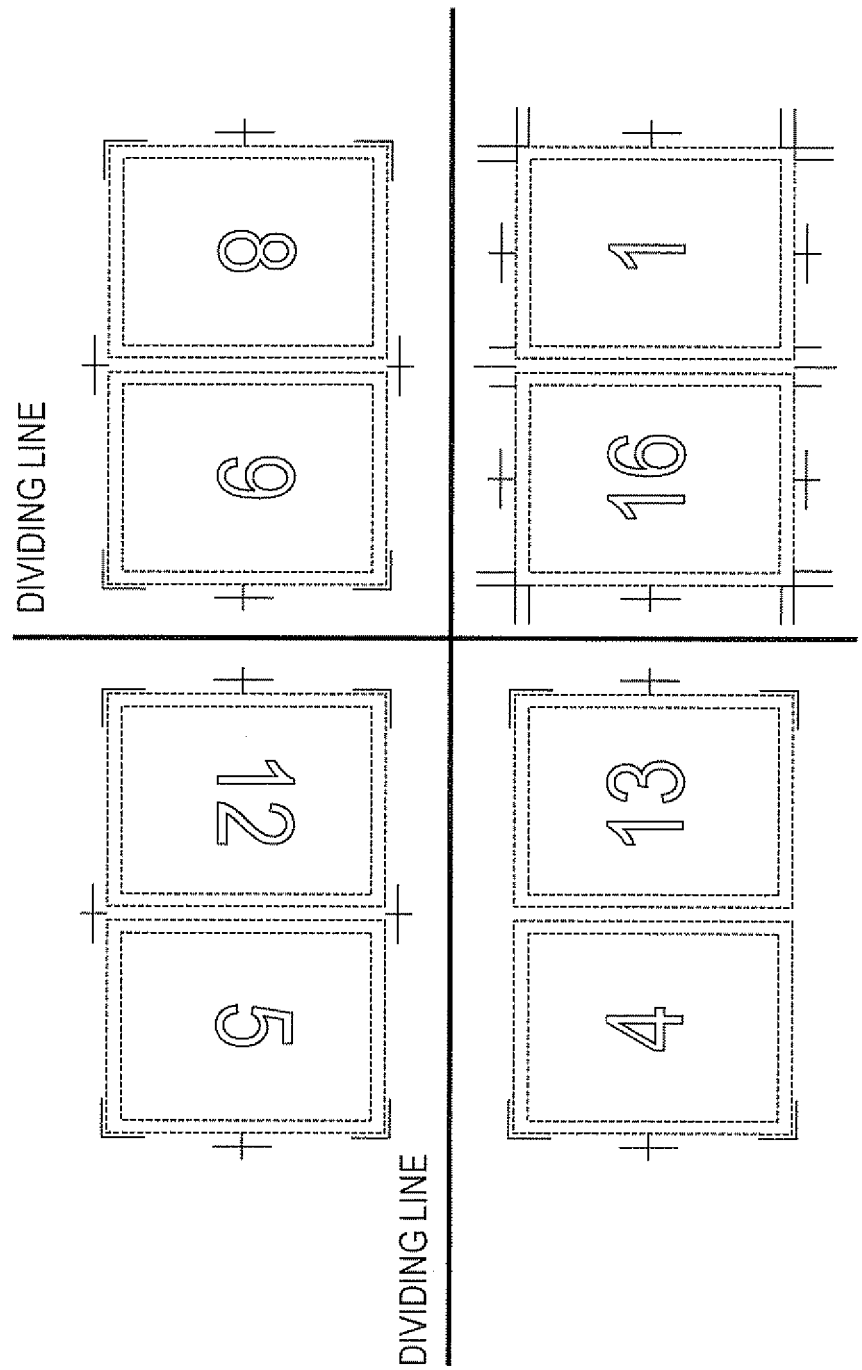
FIG. 6 is a plan view illustrating how the imposed image data is divided according to the exemplary embodiment.

The division number calculator 112 is connected to the division processor 108. When the division processor 108 receives the imposed image data from the receiving unit 102 and the division numbers X and Y from the division number calculator 112, the division processor 108 performs an image dividing process. Thus, the imposed mage data is divided as illustrated in FIG. 6. In the image dividing process, the print sheet is divided without using detailed data on the positions of images, relative positional relationships among the images, and the like. Therefore, the amount of data used for the image dividing process is smaller than the amount of data required when resister marks and the like are used for imposition.

The division processor 108 is connected to an image reversing processor 114. The image reversing processor 114 is connected to the division number calculator 112, and the division number calculator 112 issues a reverse command on the basis of division numbers that are calculated by the division number calculator 112. That is, in the present exemplary embodiment, images are laid out on a print sheet so that the top-bottom directions of some of the images are reversed in accordance with the folding method and divided. As a result, the top-bottom directions of images recorded on the recording sheets may vary.

Therefore, by using the division numbers X and Y, which are calculated by the division number calculator 112, and other data, the top-bottom directions of images included in, for example, the second half of the image data are reversed, so that the top-bottom directions of all images become the same.

The image reversing processor 114 is connected to an image position correction processor 116. The image position correction processor 116 corrects the positions of images divided on the recording sheet on the basis of the result of calculation performed by an image position correction amount calculator 118.

The image position correction amount calculator 118 calculates the correction amount of the image position on the basis of the bind width and the back width acquired from the receiving unit 102 through a bind width/back width acquisition unit 120.

That is, the image position correction amount calculator 118 acquires a bind width T and a back width S, which are included in the imposition data that is attached to the imposed image data. The image position correction amount calculator 118 calculates the margin A using the following expression (1)

$$A = G - (T/2) - S - 2P \qquad (1),$$

where L is a predetermined length of a recording sheet in the correction direction, G is the length of divided image data in the correction direction, and P is the number of pages of the divided image data in the correction direction. Then, the image position correction amount calculator 118 calculates a correction amount that is half the margin A, and sends the correction amount to the image position correction processor 116.

The image position correction processor 116 is connected to an image data output unit 122. The image position correction processor 116 sends the divided image data, which has been divided by the division processor 108, reversed when necessary, and whose position has been corrected, to an image forming controller 248.

Hereinafter, the operation of the present exemplary embodiment will be described.

Figure 10:
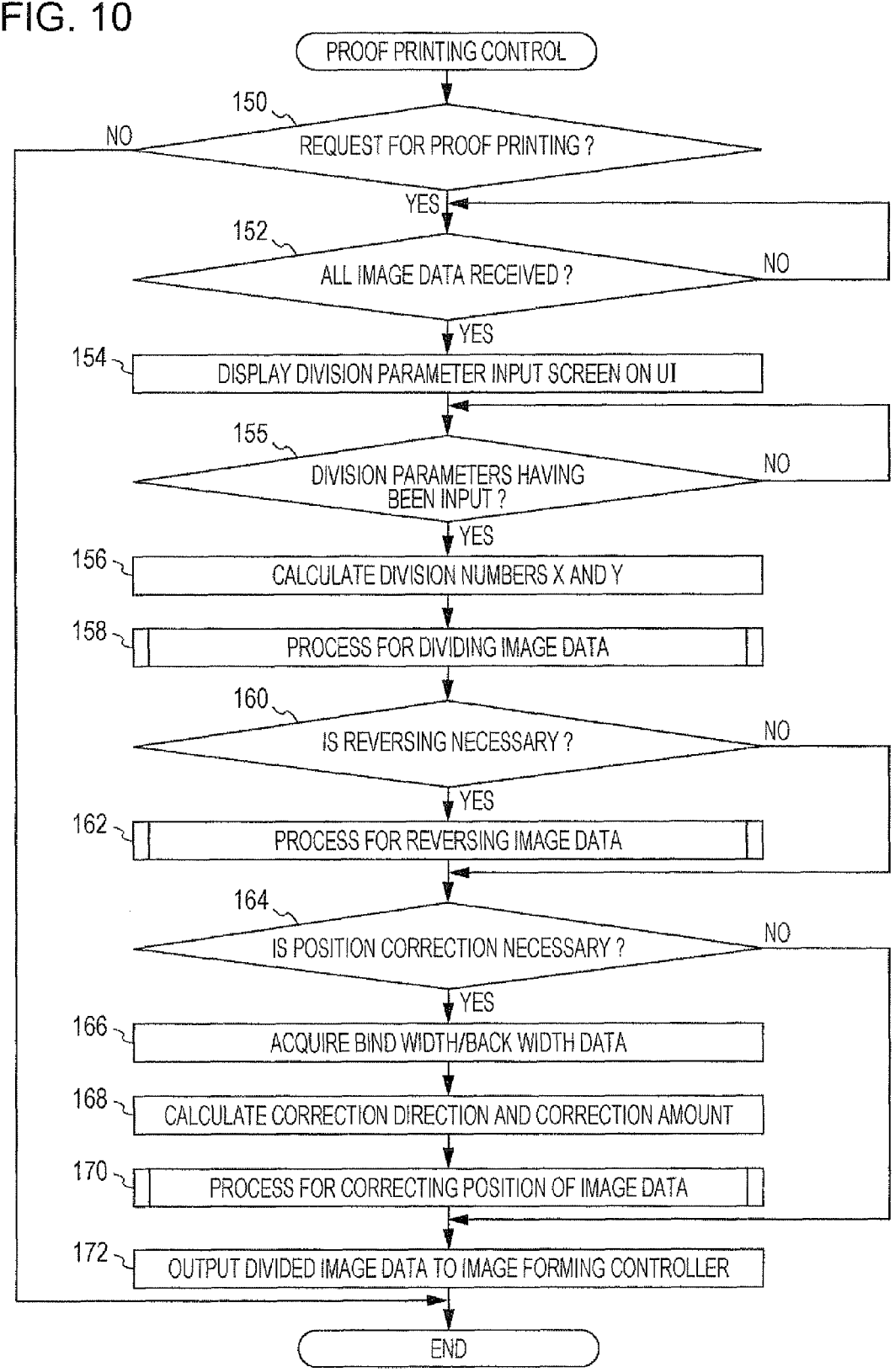
FIG. 10 is a flowchart of a proof printing control routine according to the exemplary embodiment.

FIG. 10 is a flowchart of a proof printing control routine performed by the main controller 200.

In step 150, whether or not a user has requested for proof printing is determined. If the determination in step 150 is "NO", the routine is finished. If the determination in step 150 is "YES", the process proceeds to step 152. In step 152, whether or not the imposed image data has been received is determined.

If the determination in step 152 is "YES", the process proceeds to step 154. In step 154, the input screen 30A for prompting a user to input division parameters is displayed on the UI 30, and the process proceeds to step 155.

In step 155, whether or not the user has input the division parameters is determined. If the determination in step 155 is "YES", the process proceeds to step 156. In step 156, the division numbers X and Y are calculated.

In step 158, the process of dividing the image on the basis of the division numbers X and Y, which have been calculated in step 156, is performed. In the present exemplary embodiment, the print sheet is divided into regions without using, for example, register marks for positioning imposed images on the print sheet.

When the dividing of the image data in step 158 is finished, the process proceeds to step 160. In step 160, whether or not it is necessary to reverse the divided image data is determined. In the determination in step 160 is "YES", the process proceeds to step 162. In step 162, the reversing process is performed on the image data.

That is, since the image data that has been imposed on the print sheet is divided, the top-bottom directions of some of the images may be reversed in accordance with the folding method and the binding method. Therefore, in the present exemplary embodiment, a part of the image data is reversed in accordance with the folding method and the binding method and the like. For example, in FIG. 7, the top-bottom directions of a half of the pages of the divided image data are reversed. In this case, the imposed pages are divided into two groups (i.e. Group A and Group B) each having the same top-bottom direction by referring to data regarding the top-bottom directions attached to each of the imposed pages, and the top-bottom direction of one of the two groups is reversed.

In step 164, whether or not it is necessary to perform a position correction operation on the divided image data is determined. If the determination in step 164 is "YES", the process proceeds to step 166. In step 166, the bind width T and the back width S are acquired. In step 168, the correction direction and the position correction amount are calculated on the basis of a predetermined length L of the recording sheet in the correction direction, the length G of the divided image data in the correction direction, and the number of pages P of the divided image data in the correction direction (see expression (1)). Next, the process proceeds to step 170. In step 170, the process of correcting the position of image data on the recording sheet is performed.

That is, as illustrated in FIG. 8, in the present exemplary embodiment, since the image data that has been imposed on the print sheet is divided, it may happen that the image data in the divided regions is not positioned at the centers of the regions. Therefore, the margin A is calculated on the basis of necessary parameters (the bind width T, the back width S, the length L of the recording sheet in the correction direction, the length G of the divided image data in the correction direction, the number of pages P of the image data in the correction direction), and thereby the correction direction and the correction amount are calculated.

In step 172, the divided image data is output to the image forming controller 248, and the routine is finished.

Figure 11:
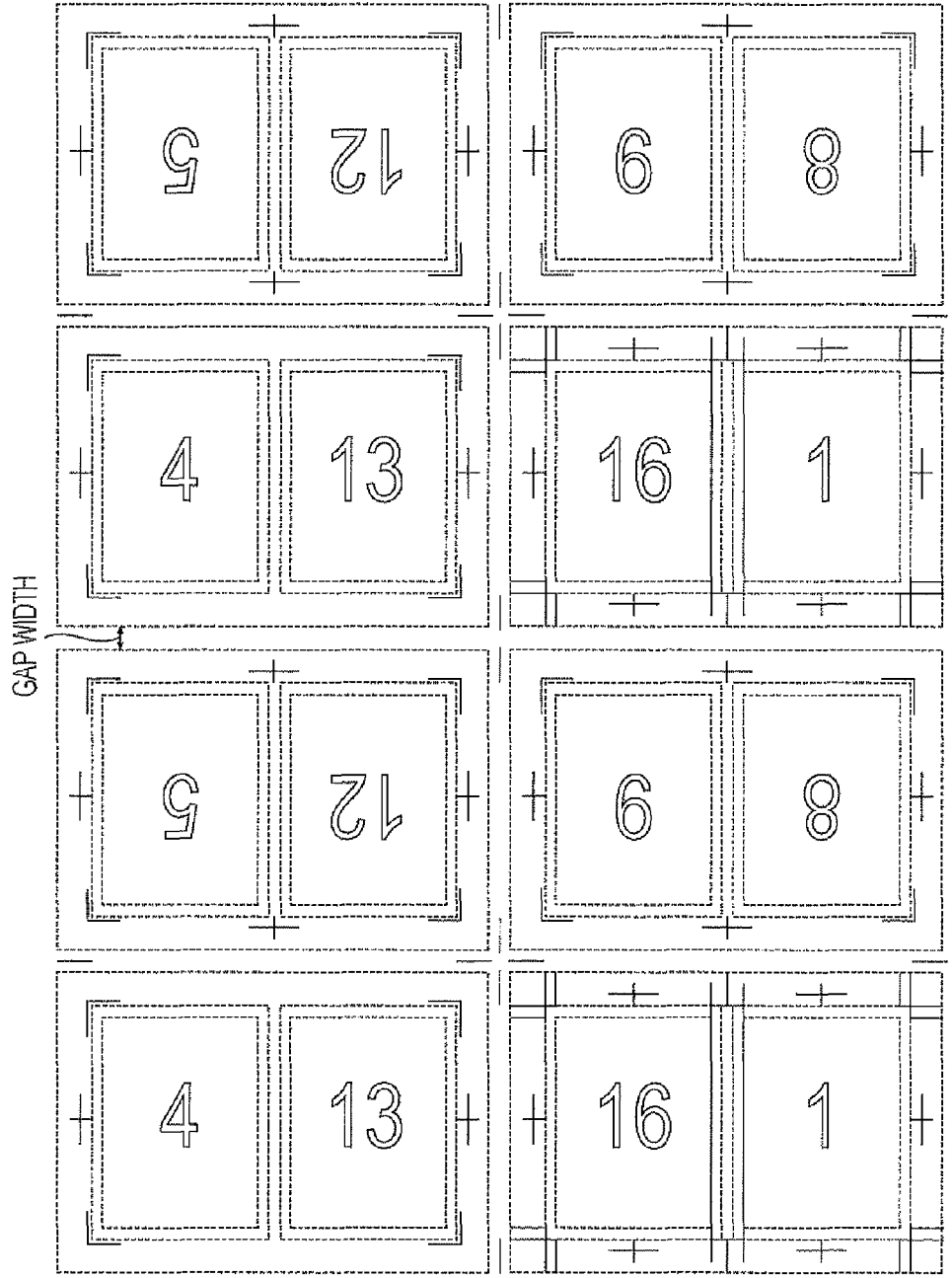
FIG. 11 is a plan view illustrating how images are (image data is) imposed on a print sheet according to a modification of the exemplary embodiment.

In the present exemplary embodiment, as illustrated in FIG. 4, an example of imposing eight pages (four pages in the horizontal direction, two pages in the vertical direction, and the horizontal page opening direction) on one side of the print sheet has been described. When, as illustrated in FIG. 11, sixteen pages (4×2, repeat, the direction toward the top of a page is rightward) are imposed in the image data, an image dividing operation may be also be performed by calculating the division numbers.

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. An image processing apparatus comprising:
   a receiving unit that receives all image data of a plurality of pages that are imposed for making a double-page-spread booklet;
   an input unit that inputs data of the number of pages in vertical and horizontal directions and data of a page opening direction of the booklet to the all image data that is received by the receiving unit, the vertical and horizontal directions being defined beforehand;
   a calculation unit that calculates a division number on the basis of the data of the number of pages and the data of the page opening direction that are input by the input unit;
   an all image data dividing unit that divides the all image data into divided image data on the basis of the division number that is calculated by the calculation unit, the all image data being received by the receiving unit; and
   an acquisition unit that acquires bind width data and back width data from the all image data, wherein, when correcting a printing position so as to adjust a width of a margin (A), the printing position being a position at which the divided image data is printed on a print sheet, the printing position is corrected by calculating the margin (A) from the acquired bind width data, the acquired back width data, a length of the print sheet in a correction direction wherein image recording is performed so that, when the divided pages are classified into two groups each having the same top-bottom direction, the top-bottom direction of the two groups are facing in the same direction by reversing of the two groups.

2. The image processing apparatus according to claim 1, wherein image recording is performed so that, when the divided pages are classified into two groups each having the same top-bottom direction, the top-bottom direction of one of the two groups is reversed.

3. An image processing system comprising: the image processing apparatus according to claim 1; and an image recording unit that records each image for the divided image data on a recording sheet that is smaller than the print sheet, the divided image data being divided by the all image data dividing unit.

4. A non-transitory computer-readable storage medium storing a program that causes a computer to function as a controller of the image processing apparatus according to claim 1.

5. The image processing apparatus according to claim 1, wherein the margin (A) is calculated using the following expression: $A=G-(T/2)-S-2P$ where G is the length of divided image data in the correction direction, T is the bind width, S is the back width and P is the number of pages of the divided image data in the correction direction.

6. The image processing apparatus according to claim 1, wherein half a number of pages in a direction that is specified as the page opening direction is a division number, and a number of pages in a direction that is not specified as the page opening direction is a different division number.

* * * * *